US012697944B2

(12) United States Patent
Jo et al.

(10) Patent No.: US 12,697,944 B2
(45) Date of Patent: Aug. 4, 2026

(54) MOVING BODY

(71) Applicants: Hyundai Motor Company, Seoul (KR); Kia Corporation, Seoul (KR); MOBINN INC., Suwon-si (KR)

(72) Inventors: Sun Myoung Jo, Ansan-si (KR); Jin Choi, Seoul (KR); Hoon Chung, Hwaseong-si (KR)

(73) Assignees: Hyundai Motor Company, Seoul (KR); Kia Corporation, Seoul (KR); MOBINN Inc., Suwon-si (KR)

( * ) Notice: Subject to any disclaimer, the term of this patent is extended or adjusted under 35 U.S.C. 154(b) by 750 days.

(21) Appl. No.: 18/166,917

(22) Filed: Feb. 9, 2023

(65) Prior Publication Data

US 2024/0075909 A1 Mar. 7, 2024

(30) Foreign Application Priority Data

Sep. 1, 2022 (KR) ........................ 10-2022-0110926

(51) Int. Cl.
| | |
|---|---|
| *B60S 9/215* | (2006.01) |
| *B25J 5/00* | (2006.01) |
| *B60S 9/22* | (2006.01) |
| *B62D 61/10* | (2006.01) |
| *B62D 61/12* | (2006.01) |

(52) U.S. Cl.
CPC ................ *B60S 9/215* (2013.01); *B60S 9/22* (2013.01); *B62D 61/10* (2013.01); *B62D 61/12* (2013.01); *B25J 5/007* (2013.01); *B60B 2900/20* (2013.01)

(58) Field of Classification Search
CPC . B60S 9/215; B60S 9/22; B62D 61/10; B62D 61/12; B25J 5/007; B60B 19/003; B60B 33/0065; B60B 2900/20
See application file for complete search history.

(56) References Cited

U.S. PATENT DOCUMENTS

| | | | | | |
|---|---|---|---|---|---|
| 1,764,486 | A | * | 6/1930 | Woolley | B60S 9/14 |
| | | | | | 180/200 |
| RE19,451 | E | * | 2/1935 | Molinare | B60D 1/66 |
| | | | | | 280/430 |
| 2,417,619 | A | * | 3/1947 | Seyferth | B60S 9/16 |
| | | | | | 254/419 |
| 2,486,409 | A | * | 11/1949 | Holmes, Jr. | B60S 9/14 |
| | | | | | 254/423 |

(Continued)

FOREIGN PATENT DOCUMENTS

| | | |
|---|---|---|
| CN | 214057757 U | 8/2021 |
| KR | 10-2010-0013905 A | 2/2010 |

(Continued)

OTHER PUBLICATIONS youtube.com [online], "Rotating in place four wheels drive electric cart (Pipe Carrier)," Feb. 10, 2021, retrieved on Jan. 27, 2023, from URL<https://www.youtube.com/watch?v=VyTAo7y8edw>, 24 pages (with English Abstract).

*Primary Examiner* — Timothy Wilhelm
(74) *Attorney, Agent, or Firm* — Fish & Richardson P.C.

(57) ABSTRACT

A moving body including a body, a wheel coupled to the body and configured to rotate relative to the body, and an auxiliary wheel connected to the body and configured to move upwards and downwards. The auxiliary wheel has an area protruding more downwards than the wheel when the auxiliary wheel is moved to a lowermost side.

17 Claims, 6 Drawing Sheets

(56)            References Cited

U.S. PATENT DOCUMENTS

| | | | | | |
|---|---|---|---|---|---|
| 2,803,307 | A | * | 8/1957 | Ferrer | B60S 9/215 |
| | | | | | 254/423 |
| 2,809,054 | A | * | 10/1957 | Miller | B60S 9/16 |
| | | | | | 280/429 |
| 3,003,571 | A | * | 10/1961 | Ash | B60S 9/215 |
| | | | | | 180/202 |
| 3,028,176 | A | * | 4/1962 | Raidel | B60D 1/66 |
| | | | | | 280/764.1 |
| 3,081,065 | A | * | 3/1963 | Dalton | B60S 9/16 |
| | | | | | 254/419 |
| 3,120,398 | A | * | 2/1964 | Butterworth | B60S 9/20 |
| | | | | | 180/199 |
| 3,246,709 | A | * | 4/1966 | Lossev | B60S 9/04 |
| | | | | | 180/200 |
| 3,246,710 | A | * | 4/1966 | Grossmann | B60S 9/18 |
| | | | | | 180/53.8 |
| 3,269,744 | A | * | 8/1966 | Dobson | B60S 9/14 |
| | | | | | 280/43.23 |
| 3,326,312 | A | * | 6/1967 | Buller | B62D 12/00 |
| | | | | | 280/43.23 |
| 3,439,765 | A | * | 4/1969 | Keegan | B60K 17/36 |
| | | | | | 180/24.12 |
| 3,623,562 | A | * | 11/1971 | Pitra | B60S 9/14 |
| | | | | | 180/200 |
| 3,642,085 | A | * | 2/1972 | Bird | B60G 21/06 |
| | | | | | 180/41 |
| 3,879,058 | A | * | 4/1975 | Horn | B62D 43/002 |
| | | | | | 414/466 |
| 4,119,156 | A | * | 10/1978 | Wheeler | A01B 3/46 |
| | | | | | 172/417 |
| 4,121,680 | A | * | 10/1978 | van der Lely | B62D 61/12 |
| | | | | | 180/53.3 |
| 4,516,653 | A | * | 5/1985 | Walker | B60S 9/20 |
| | | | | | 180/199 |
| 4,711,464 | A | * | 12/1987 | Bilas | B62D 61/12 |
| | | | | | 180/209 |
| 4,834,206 | A | * | 5/1989 | Ching-Tang | B60S 9/215 |
| | | | | | 180/202 |
| 4,892,503 | A | * | 1/1990 | Kumazawa | A63H 17/004 |
| | | | | | 446/460 |
| 4,955,450 | A | * | 9/1990 | Deinlein-Kalb | B60S 9/205 |
| | | | | | 180/199 |
| 4,971,170 | A | * | 11/1990 | Rasmussen | B60K 6/00 |
| | | | | | 903/902 |
| 5,370,196 | A | * | 12/1994 | Bishop | B62D 61/12 |
| | | | | | 280/405.1 |
| 5,516,135 | A | * | 5/1996 | Christenson | B62D 61/12 |
| | | | | | 280/405.1 |

| | | | | | |
|---|---|---|---|---|---|
| 5,597,174 | A | * | 1/1997 | Christenson | B60G 5/04 |
| | | | | | 180/209 |
| 5,713,424 | A | * | 2/1998 | Christenson | B62D 61/12 |
| | | | | | 180/209 |
| 6,203,030 | B1 | * | 3/2001 | Storms | B62D 61/12 |
| | | | | | 280/475 |
| 6,213,491 | B1 | * | 4/2001 | Southard, Jr. | B60D 1/66 |
| | | | | | 280/475 |
| 6,371,499 | B1 | * | 4/2002 | Konop | B62D 61/12 |
| | | | | | 180/209 |
| 6,494,474 | B1 | * | 12/2002 | Kramer, Jr. | A61G 5/06 |
| | | | | | 180/209 |
| 6,725,956 | B1 | * | 4/2004 | Lemire | A61G 7/08 |
| | | | | | 180/209 |
| 6,942,053 | B2 | * | 9/2005 | Hinton | B62D 61/12 |
| | | | | | 180/209 |
| 7,392,854 | B2 | * | 7/2008 | Ikeda | A01B 33/028 |
| | | | | | 172/676 |
| 7,784,812 | B1 | * | 8/2010 | Lares | B62D 12/00 |
| | | | | | 180/14.4 |
| 7,921,952 | B2 | * | 4/2011 | Tseng | B60S 9/215 |
| | | | | | 180/199 |
| 8,083,013 | B2 | * | 12/2011 | Bewley | B62D 37/00 |
| | | | | | 180/199 |
| 8,162,351 | B2 | * | 4/2012 | Lee | B25J 13/081 |
| | | | | | 280/755 |
| 8,851,499 | B1 | * | 10/2014 | Thompson | B62D 61/12 |
| | | | | | 280/304 |
| 9,334,003 | B2 | * | 5/2016 | Segard | B60D 1/30 |
| 9,862,361 | B2 | * | 1/2018 | Betz | B60S 9/215 |
| 10,597,006 | B2 | * | 3/2020 | Betz | B60S 9/215 |
| 11,993,123 | B2 | * | 5/2024 | Lai | B60G 21/005 |
| 11,993,328 | B2 | * | 5/2024 | Olsson | B60G 17/0157 |
| 12,269,531 | B2 | * | 4/2025 | Jo | B62D 21/14 |
| 2005/0045398 | A1 | * | 3/2005 | Suzuki | B62D 61/12 |
| | | | | | 180/209 |
| 2007/0259602 | A1 | * | 11/2007 | Dunham | A63H 17/262 |
| | | | | | 446/466 |
| 2010/0155165 | A1 | * | 6/2010 | Tseng | B60S 9/215 |
| | | | | | 180/200 |
| 2011/0132671 | A1 | | 6/2011 | Lee et al. | |

FOREIGN PATENT DOCUMENTS

| | | |
|---|---|---|
| KR | 10-2012-0059427 A | 6/2012 |
| KR | 10-2012-0133345 A | 12/2012 |
| KR | 10-1892074 B | 8/2018 |
| KR | 10-2018-0133238 A | 12/2018 |
| KR | 10-2019-0087018 A | 7/2019 |

* cited by examiner

MOVING BODY

CROSS-REFERENCE TO RELATED APPLICATION

This application claims the benefit of priority to Korean Patent Application No. 10-2022-0110926, filed in the Korean Intellectual Property Office, on Sep. 1, 2022, the entire contents of which are incorporated herein by reference.

TECHNICAL FIELD

The present disclosure relates to a moving body.

BACKGROUND

A moving body may refer to an object that may move by using wheels or other means. In recent years, with development of robot technologies, moving bodies in various forms have been developed. For instance, a moving body having a four-wheel structure with no steering device may be utilized in a field of unmanned delivery or the like. As an example for performing a steering function, a four-wheel structure robot with no steering device may have wheels that may be rotated forwards and reversely.

In some cases, where the moving body moves forwards, a wheel located on a left side may be rotated reversely and a wheel located on a right side may be rotated forwardly whereby a left rotation thereof may be made, and a right rotation thereof may be made through an opposite process. The rotation may be made in a scheme of turning the moving body at the same place, and thus has an advantage in mobility.

However, when the moving body having a four-wheel structure is turned by a front wheel, a rear wheel is slipped, whereby a stability of the moving body may be degraded. Furthermore, a skid mark may be caused on a ground surface through a slip phenomenon, and a durability of a tire may be badly influenced.

SUMMARY

The present disclosure describes a moving body that does not cause a slip phenomenon during turning.

According to one aspect of the present disclosure, a moving body includes a body, a wheel coupled to the body to be rotatable, and an auxiliary wheel connected to the body to be movable upwards and downwards, and the auxiliary wheel has an area protruding more downwards than the wheel with reference to a time when the auxiliary wheel is moved on a lowermost side.

In some implementations, the moving body can further include a connector connecting the body and the auxiliary wheel, and the connector can include a rotary shaft extending in leftward and rightward directions, an auxiliary wheel motor that rotates the rotary shaft about the leftward and rightward directions, a first rotary member coupled to the rotary shaft and interworking with rotation of the rotary shaft to be rotated about the rotary shaft, and a connection member interworking with rotation of the first rotary member to be movable upwards and downwards, extending upwards and downwards, and connected to the auxiliary wheel.

In some implementations, the connector can further include a second rotary member, in which the first rotary member is connected to an upper side thereof to be rotatable and the connection member is connected to a lower side thereof to be rotatable.

In some implementations, the rotary shaft and the connection member can be spaced apart from each other along forward and rearward directions.

In some implementations, when, among forward and rearward directions, a direction facing the rotary shaft from the connection member is defined as a reference direction, the body can have a contact part that contacts a side surface of the first rotary member in the reference direction when the connection member is moved on a lowermost side to obstruct rotation of the first rotary member in the reference direction.

In some implementations, a protrusion protruding in the reference direction can be formed at a lower end of the first rotary member with reference to a location of the first rotary member when the connection member is moved to a lowermost side.

In some implementations, the body can further include a support area contacting an upper surface of the protrusion and that supports the upper surface of the protrusion downwards.

In some implementations, the second rotary member can be disposed in a direction that crosses upward and downward directions with reference to a time when the connection member is moved to a lowermost side.

In some implementations, when, among the forward and rearward directions, a direction facing the rotary shaft from the connection member is defined as a reference direction, an upper end of the second rotary member can be located on a side of a lower end of the second rotary member in the reference direction.

In some implementations, the body can further include a linear guide member disposed on front and rear sides of the connection member and that obstructs forward and rearward movements of the connection member.

In some implementations, grooves extending upwards and downwards can be formed on front and rear surfaces of the connection member, and the linear guide member can have an insertion portion that is inserted into the grooves.

In some implementations, a lengthwise length of the first rotary member can be smaller than a lengthwise length of the second rotary member.

In some implementations, a rotation axis corresponding to rotation centers of the first rotary member and the second rotary member and a rotation axis corresponding to rotation centers of the second rotary member and the connection member can be formed in parallel to an extension direction of the rotary shaft.

In some implementations, the auxiliary wheel can perform both of a first rotation made while a first axis extending upwards and downwards is taken as a center thereof and a second rotation made while a second axis extending in a second direction that is one direction that is perpendicular to the upward and downward directions.

DETAILED DESCRIPTION

Figure 1:
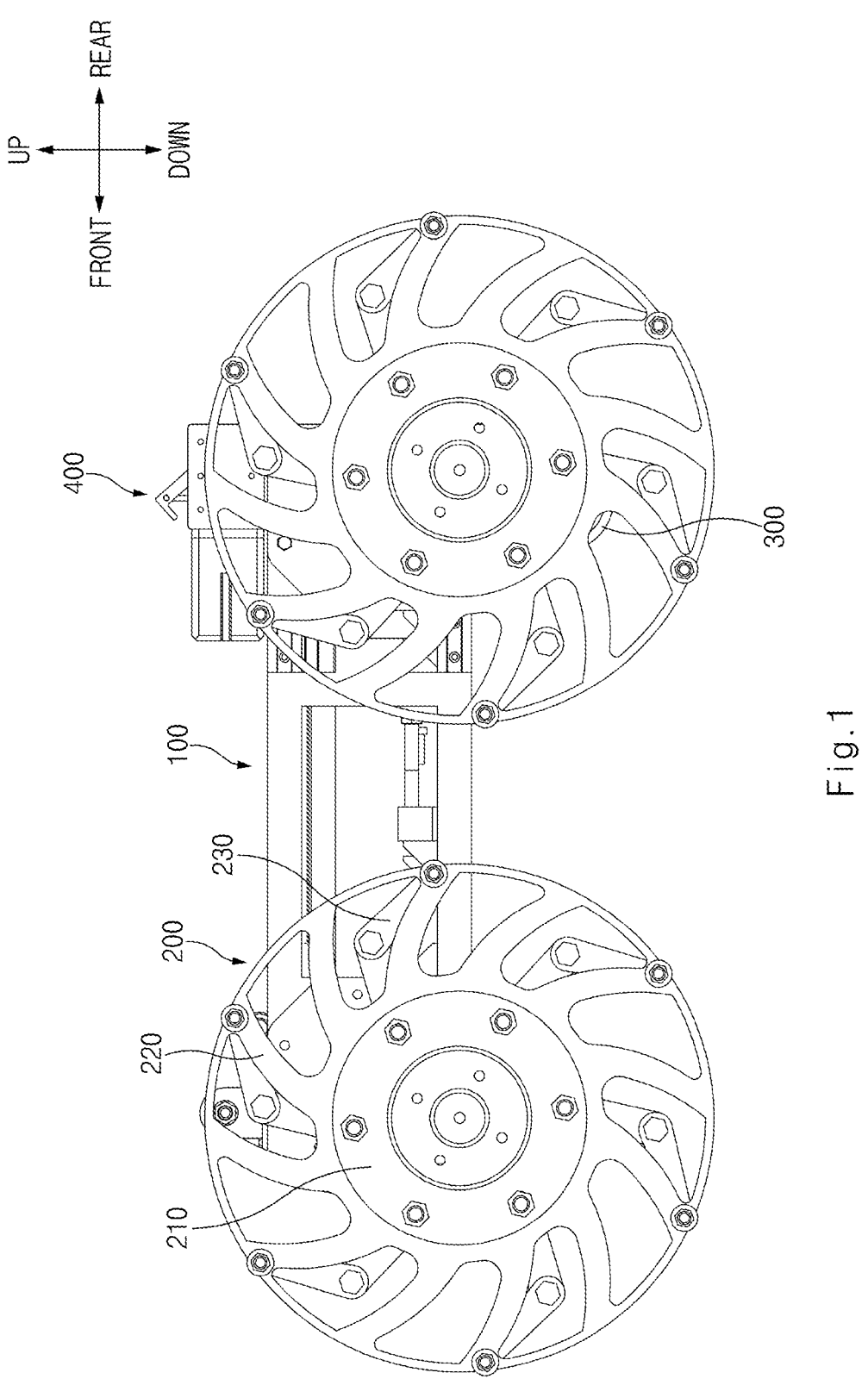
FIG. 1 is a view illustrating an appearance of an example of a moving body when viewed from a left side.

Hereinafter, some implementations of the present disclosure will be described in detail with reference to the exemplary drawings. In providing reference numerals to the constituent elements of the drawings, the same elements can have the same reference numerals even if they are displayed on different drawings. Further, in the following description of the present disclosure, a detailed description of known functions and configurations incorporated herein will be omitted when it can make the subject matter of the present disclosure rather unclear.

A moving body described in the present disclosure may not cause slip of a wheel during turning. The moving body can refer to a structure, such as a vehicle, which can be moved through a wheel or other moving means.

Figure 2:
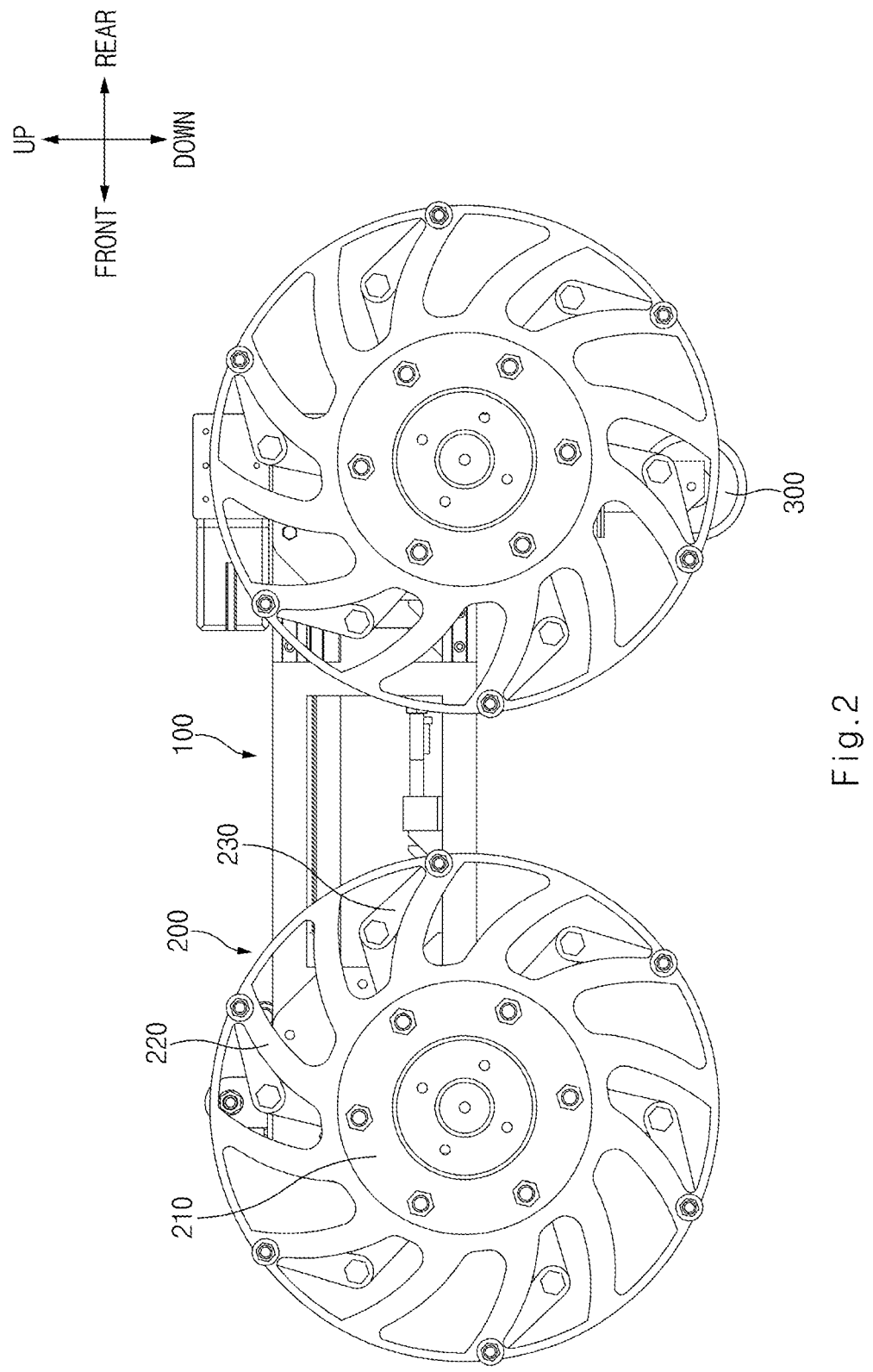
FIG. 2 is a view illustrating an appearance of an example of an auxiliary wheel in FIG. 1, which is lowered.
Figure 3:
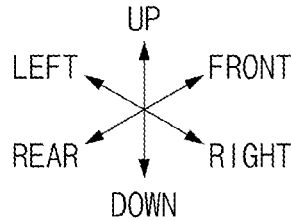
FIG. 3 is a perspective view illustrating an appearance of an example of a moving body when viewed from a rear side.
Figure 3:
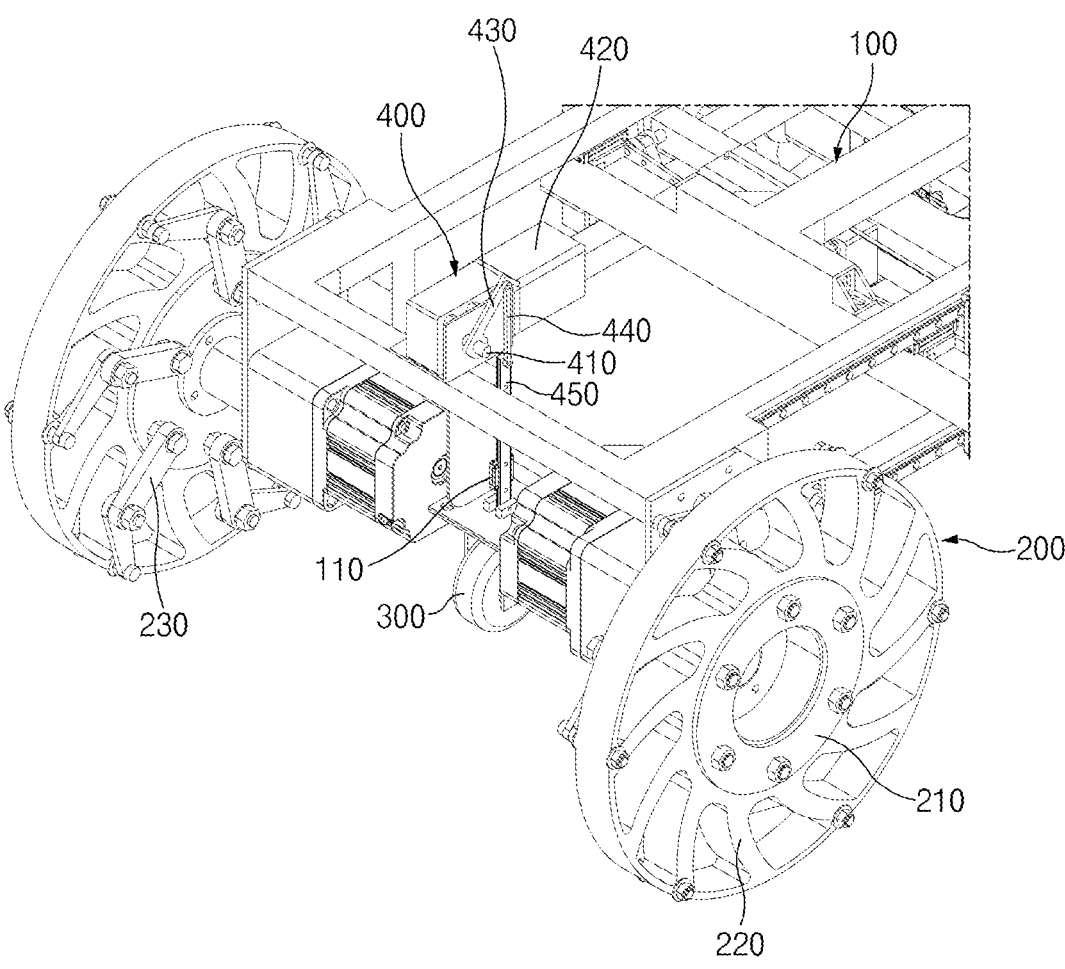
Figure 4:
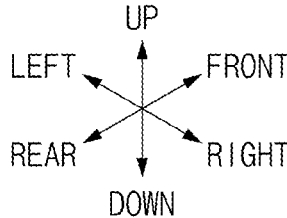
FIG. 4 is a view illustrating the auxiliary wheel in FIG. 3, which is lowered.
Figure 4:
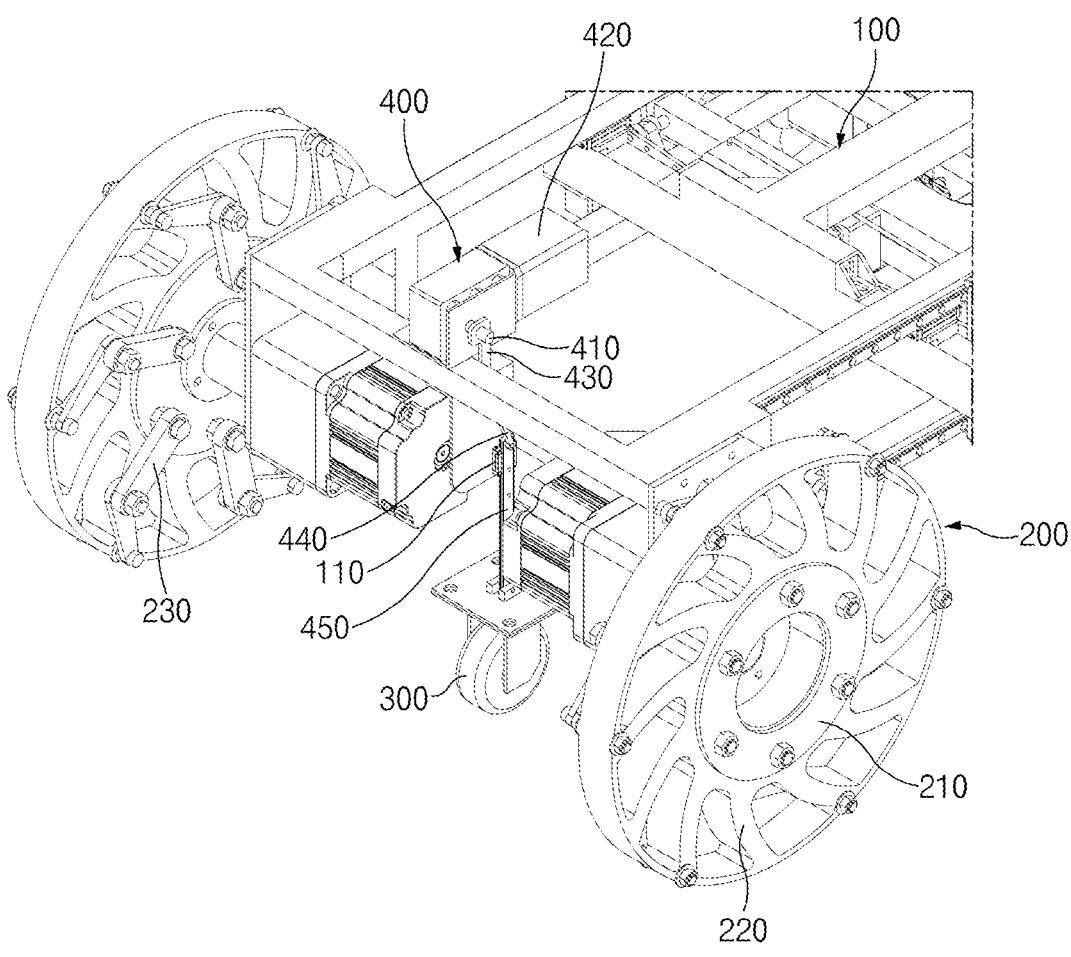

FIG. 1 is a view illustrating an appearance of an example of a moving body when viewed from a left side. FIG. 2 is a view illustrating an appearance of an example of an auxiliary wheel in FIG. 1, which is lowered. FIG. 3 is a perspective view illustrating an appearance of the moving body when viewed from a rear side. FIG. 4 is a view illustrating an appearance of the auxiliary wheel in FIG. 3, which is lowered.

In some implementations, the moving body can include a body 100, wheels 200, and an auxiliary wheel 300. A length of the body 100 in forward and rearward directions can be adjusted. The wheel 200 can be coupled to the body 100 to be rotatable. Then, the wheels 200 can be configured to be rotated forwardly and reversely while being coupled to the body 100. For example, the wheels 200 can be coupled to motors in one-to-one correspondence. The wheels 200 can have front wheels and rear wheels. At least one of the front wheels and the rear wheels can be one pair.

The wheels 200 can move not only on a flat surface but on a ground surface, including stairs. As an example, as illustrated in FIG. 1, each of the wheels 200 can include a frame 210, spokes 220, and linkages 230. As an example, the spoke 220 can include a pair of cylindrical members, diameters of which are different and centers of which are the same, and members that connect them. The linkages 230 can connect the frame 210 and the spokes 220, and can have a structure, in which lengths thereof can be changed along a radial direction of the wheels 200. For example, each of the linkages 230 can include a first link member, one side of which is coupled to a radially outer side of the spoke 220 and a second link member, one side of which is coupled to a radially inner side of the spoke 220, and the first link member and the second link member can be coupled to each other to be rotatable with respect to each other.

The auxiliary wheel 300 can be connected to the body 100 to be movable upwards and downwards. As illustrated in FIG. 2, the auxiliary wheel 300 can have an area that protrudes more downwards than the wheel 200 with reference to a time when it is moved to a lowermost side. This can mean that the auxiliary wheel 300 contacts the ground surface, a portion of the wheel 200 contacts the ground surface, and the remaining portions thereof may not contact the ground surface when the auxiliary wheel 300 is moved to a lowermost side.

For example, as illustrated in FIG. 2, when the auxiliary wheel 300 is moved to the lowermost side, the front wheel can contact the ground surface, the auxiliary wheel 300 can contact the ground surface, and the rear wheel can be spaced apart from the ground surface.

As an example, the auxiliary wheel 300, as illustrated in FIG. 2, can be disposed on a rear side of the body 100, but this is an example, and it can be disposed on a front side of the body 100.

The auxiliary wheel 300 can be configured to perform both a first rotation made while a first axis extending upwards and downwards is taken as a center thereof and a second rotation made while a second axis extending in a second direction that is one direction that is perpendicular to the upward and downward directions. As an example, as illustrated in FIG. 3, the auxiliary wheel 300 can have a caster wheel structure that is used for a cart or furniture. As another example, the auxiliary wheel 300 can be a ball caster. That is, the auxiliary wheel 300 can have various shapes in a range, in which both the first rotation and the second rotation can be made.

According to the moving body, because the auxiliary wheel 300 can be made to contact the ground surface and, among the wheels, the wheel that can be slipped can be spaced apart from the ground surface, a slip phenomenon that can be caused by frictions between the wheel 200 and the ground surface can be prevented during a turning operation thereof.

The moving body can further include a connector 400. The connector 400 can be a configuration that connects the body 100 and the auxiliary wheel 300. Furthermore, the connector 400 can be a configuration for moving the auxiliary wheel 300 upwards and downwards.

Figure 5:
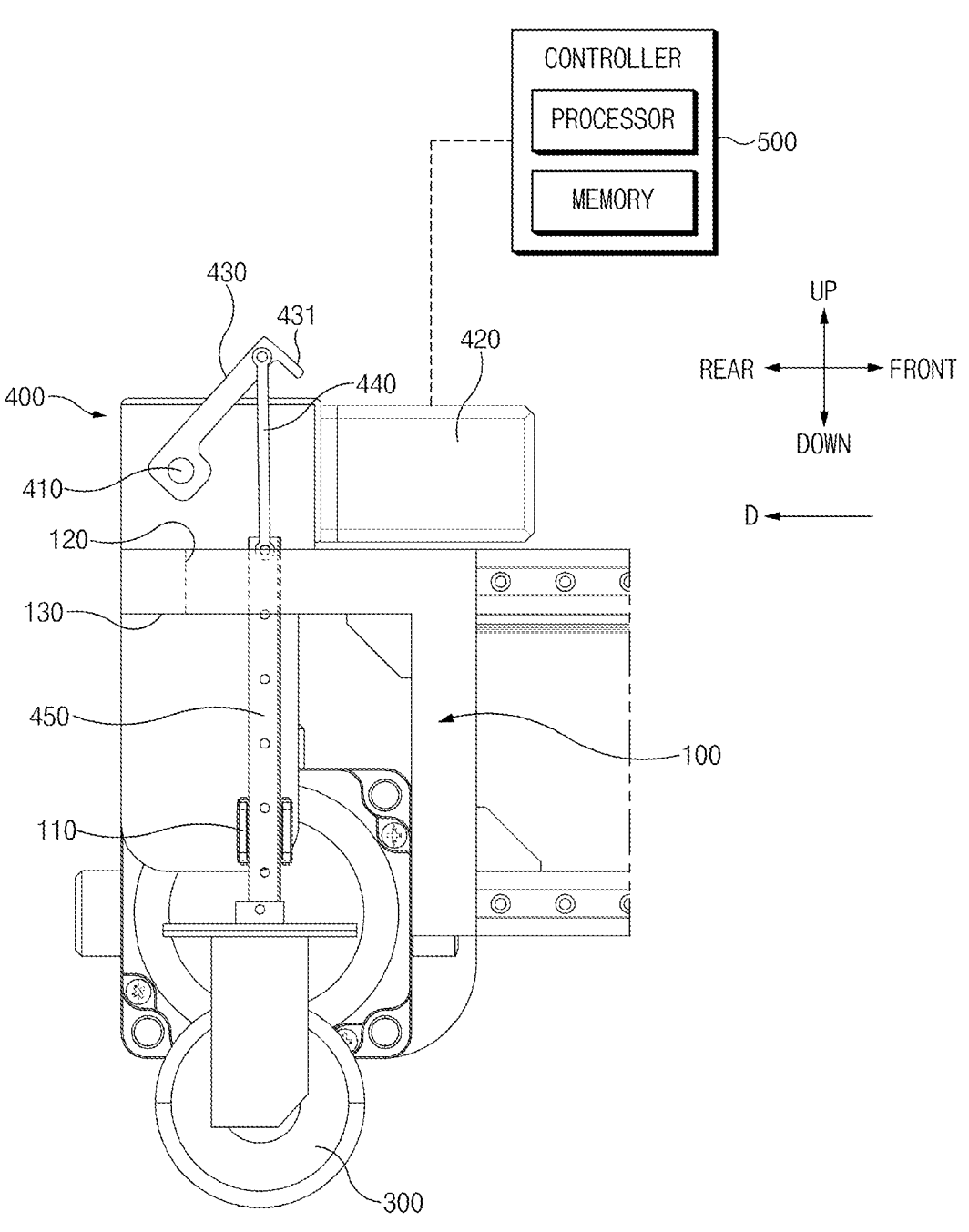
FIG. 5 is a view illustrating an example of a connector when an auxiliary wheel is moved upwards.
Figure 6:
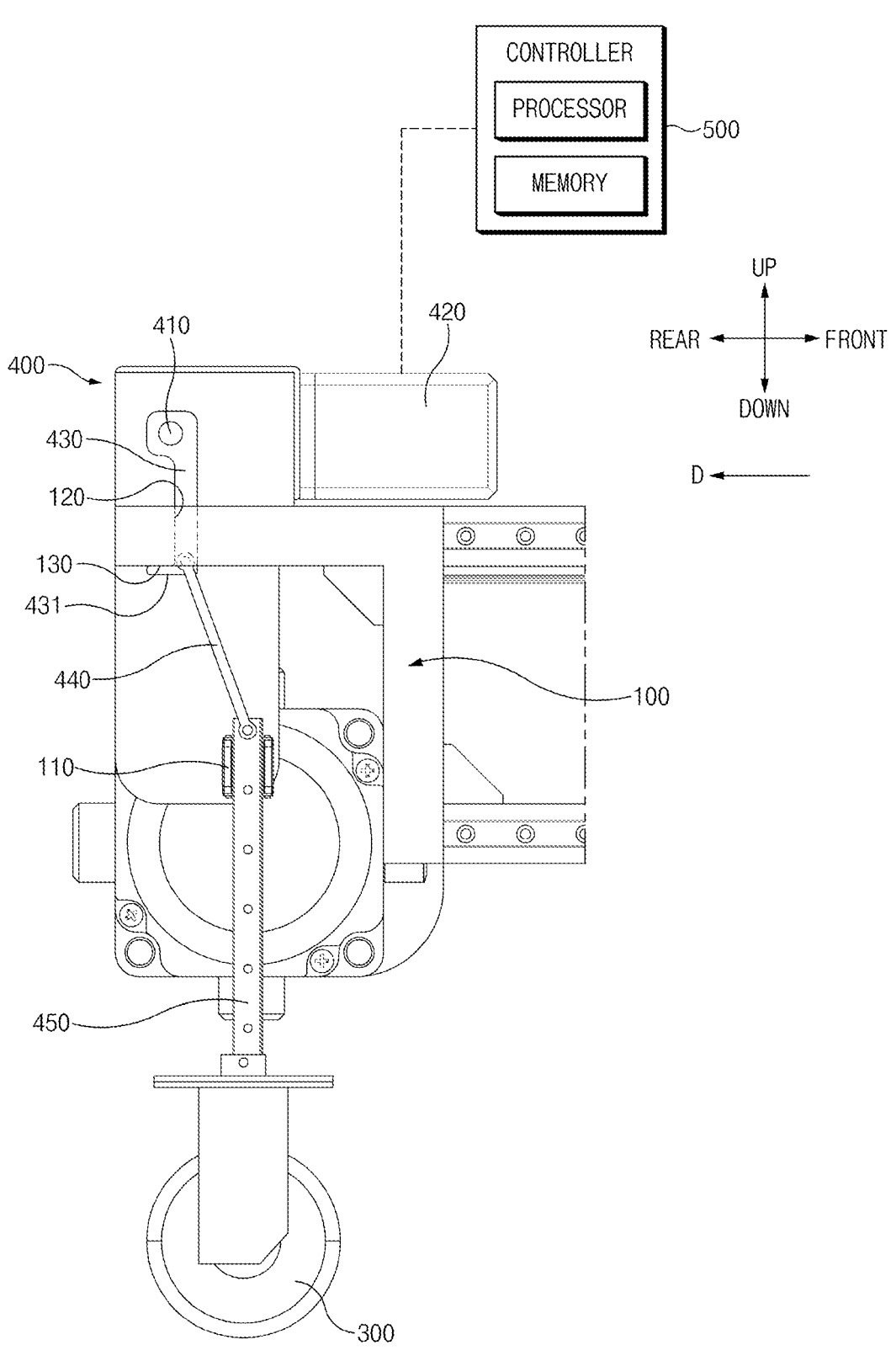
FIG. 6 is a view illustrating the connector when an auxiliary wheel is moved downwards.

FIG. 5 is a view illustrating the connector when the auxiliary wheel is moved upwards. FIG. 6 is a view illustrating the connector when the auxiliary wheel is moved downwards. Hereinafter, a detailed configuration of the connector 400 that can move the auxiliary wheel 300 upwards and downwards will be described in detail with reference to FIGS. 5 and 6.

The connector 400 can include a rotary shaft 410, an auxiliary wheel motor 420, a first rotary member 430, and a connection member 450.

The rotary shaft 410 can extend in the leftward and rightward directions. The auxiliary wheel motor 420 can be configured to rotate the rotary shaft 410 about the leftward and rightward directions.

The first rotary member 430 can be coupled to the rotary shaft 410. The first rotary member 430 can interwork with rotation of the rotary shaft 410 to be rotated about the rotary shaft 410. As an example, as illustrated in FIGS. 5 and 6, the first rotary member 430 can be fixedly coupled to the rotary shaft 410.

The connection member 450 can interwork with rotation of the first rotary member 430 to be moved upwards and downwards. This can mean that the connection member 450 can be moved upwards or downwards when the first rotary member 430 is rotated. The connection member 450 can have a shape that extends upwards and downwards. The connection member 450 can be connected to the auxiliary wheel 300. As the connection member 450 is connected to the auxiliary wheel 300, the auxiliary wheel 300 also can be moved when the connection member 450 is moved upwards and downwards.

In some examples, the body 100 can further include linear guide members 110. The linear guide members 110 can be disposed on front and rear sides of the connection member 450 to obstruct forward and rearward movements of the connection member 450. This can be understood that it guides movement of the connection member 450 to upward and downward directions. Here, the disposition on the front and rear sides does not mean only that a pair of separate objects are essentially provided and they are disposed on the front side and the rear side, respectively, but, as illustrated in FIG. 3, can mean that the connection member 450 has a single configuration and they are disposed on the front side and the rear side of the connection member 450, respectively, and a cross-section thereof in a horizontal direction has a substantially U shape.

Grooves that extend in the upward and downward directions can be formed on front and rear surfaces of the connection member 450. Furthermore, each of the linear guide members 110 can have an insertion portion that is configured to be inserted into the groove. However, the present disclosure is not limited thereto, and upwardly and downwardly protrusions can be formed on the front and rear surfaces of the connection member 450 and the grooves corresponding thereto also can be formed in the linear guide members 110.

The connector 400 can further include a second rotary member 440. The first rotary member 430 can be connected to an upper side of the second rotary member 44 to be rotatable. Furthermore, the connection member 450 can be connected to a lower side of the second rotary member 440 to be rotatable. That is, the second rotary member 440 can be a configuration for connecting the first rotary member 430 and the connection member 450.

A lengthwise length of the first rotary member 430 can be smaller than a lengthwise length of the second rotary member 440. Furthermore, a rotation axis corresponding to rotation centers of the first rotary member 430 and the second rotary member 440 and a rotation axis corresponding to rotation centers of the second rotary member 440 and the connection member 450 can be formed in parallel to an extension direction of the rotary shaft 410.

In some examples, when the auxiliary wheel 300 is moved downwards, the auxiliary wheel 300 contacts the ground surface. When the auxiliary wheel 300 contacts the ground surface, it is pressed by the ground surface and receives a force, by which it tends to move upwards. Hereinafter, a structure of the connector 400 and a structure of the body 100, which can prevent the auxiliary wheel 300 from being moved upwards even when the auxiliary wheel 300 is pressed by the ground surface, will be described in detail.

Hereinafter, among the forward and rearward directions, a direction that face the rotary shaft 410 from the connection member 450 will be referred to as a reference direction "D" for convenience of description. The reference direction "D" can be a rearward direction with reference to FIG. 5.

The rotary shaft 410 and the connection member 450 can be spaced apart from each other along the forward and rearward directions. As an example, the rotary shaft 410 can be located on a rear side of the connection member 450.

The body 100 can have a contact part 120. The contact part 120 can mean an area that contacts a side surface of the first rotary member 430 in the reference direction "D" when the connection member 450 is moved to a lowermost side. The contact part 120 can be a configuration for allowing the first rotary member 430 to be rotated within a specific range by obstructing rotation of the first rotary member 430 in the reference direction "D".

In some examples, the second rotary member 440 can be disposed in a direction that crosses the upward and downward directions with reference to a time when the connection member 450 is moved to a lowermost side. As an example, an upper end of the second rotary member 440 can be located in the reference direction "D" of a lower end of the second rotary member 440. As illustrated in FIG. 5, an upper end of the second rotary member 440 can be located on a rear side of a lower end of the second rotary member 440.

As an upper end of the second rotary member 440 is located in the reference direction "D" of the second rotary member 440 with respect to a lower end of the second rotary member 440, the lower end of the second rotary member 440 tends to be moved upwards when the auxiliary wheel 300 tends to be moved upwards as the auxiliary wheel 300 is pressed upwards by the ground surface. In some examples, because a length of the second rotary member 440 is constant, the upper end of the second rotary member 440 is moved upwards or receives a force, by which it tends to be moved in the reference direction "D" when the lower end or the second rotary member 440 is moved upwards. Then, according to the present disclosure, because the upward movement is made impossible due to a connection relationship with the first rotary member 430, the upper end of the second rotary member 440 receives a force, by which it tends to be moved in the reference direction "D". Accordingly, a portion of the first rotary member 430, which is connected to the second rotary member 440, also receives a force, by which it tends to be moved in the reference direction "D".

In some implementations, rotation of the first rotary member 430 in the reference direction "D" is obstructed by an interference with the contact part 120. This can mean that the first rotary member 430 is supported in an opposite direction to the reference direction "D" by the contact part 120. Accordingly, the first rotary member 430 is not moved even when the auxiliary wheel 300 is pressed upwards by the ground surface, and thus the second rotary member 440 is not moved, and because the connection member 450 also is not moved, the auxiliary wheel 300 may not be moved upwards.

In some examples, when the auxiliary wheel 300 is not being used, the auxiliary wheel motor 420 is operated, and the rotary shaft 410 can be rotated in a counterclockwise direction with reference to FIG. 5. The rotary shaft 410 can rotate the first rotary member 430. In this case, because the movement of the first rotary member 430 is not restricted, the first rotary member 430 is rotated toward an opposite direction to the reference direction "D", and thus the auxiliary wheel 300 can be moved upwards while the second rotary member 440 and the connection member 450 are sequentially moved. This can be understood that the state of FIG. 6 is changed to the state of FIG. 5.

In some examples, when the auxiliary wheel 300 is used again, the auxiliary wheel motor 420 is operated, and the rotary shaft 410 can be rotated in a clockwise direction with reference to FIG. 5. The rotary shaft 410 can rotate the first rotary member 430. The first rotary member 430 can be rotated until it contacts the contact part 120. Accordingly, the second rotary member 440 and the connection member 450 can move the auxiliary wheel 300 downwards while being sequentially moved. This can be understood that the state of FIG. 5 is changed to the state of FIG. 6.

In some examples, when the rotary shaft 410 tends to rotate continuously even after the first rotary member 430 contacts the contact part 120, the first rotary member 430 can be damaged or deformed. Accordingly, it is necessary to adjust a rotation degree of the rotary shaft 410. To adjust the rotation degree of the rotary shaft 410, the auxiliary wheel motor 420 can be connected to a controller.

A controller 500 can be configured to perform a control method such that the rotation degree of the rotary shaft 410 is adjusted. The controller 500 can include a processor and a memory. The processor can include a microprocessor such as a field Programmable gate array (FPGA), an application specific integrated circuit (ASIC), a central processing unit (CPU). The memory can store control instructions that are basic in generating instructions for determining the rotation degree of the rotary shaft 410, by the processor. The memory can be a data storage such as a hard disk drive (HDD), a solid state drive (SSD), a volatile medium, and a nonvolatile medium.

As an example, the controller 500 can adjust the rotation degree of the rotary shaft 410 by controlling an operation time of the auxiliary wheel motor 420. As another example, the controller 500 can directly measure the rotation degree of the rotary shaft 410 to control an operation of the auxiliary wheel motor 420. In addition, the controller 500 can control an operation of the auxiliary wheel motor 420 in a range in which the rotation degree of the rotary shaft 410 can be adjusted.

Because the auxiliary wheel 300 is connected to the rotary shaft 410 through the connection member 450, the second rotary member 440, and the first rotary member 430 when it is pressed upwards by the ground surface, a high load can be applied to the rotary shaft 410. In this case, the rotary shaft 410 can be damaged or deformed. Hereinafter, a structure for dispersing a load applied to the rotary shaft 410 will be described in detail.

A protrusion 431 can be formed in the first rotary member 430. The protrusion 431 can mean an area that protrudes from the lower end of the first rotary member 430 in the reference direction "D" with respect to a location of the first rotary member 430 when the connection member 450 is moved to a lowermost side.

The body 100 can include a support area 130. The support area 130 can be configured to contact an upper surface of the protrusion 431 to support the upper surface of the protrusion downwards. As the support area 130 supports the upper surface of the protrusion 431 downwards, a load that has to be applied to the rotary shaft 410 can be applied to the support area 130. Accordingly, the load applied to the rotary shaft 410 can be decreased, and a damage to the rotary shaft 410 can be reduced.

According to the present disclosure, a slip phenomenon can be prevented during turning of a moving body through an auxiliary wheel structure that can perform both rotation about upward and downward directions and rotation about one direction that is perpendicular to the upward and downward directions.

The above description is a simple exemplification of the technical spirits of the present disclosure, and the present disclosure can be variously corrected and modified by those skilled in the art to which the present disclosure pertains without departing from the essential features of the present disclosure. Accordingly, the implementations disclosed in the present disclosure is not provided to limit the technical spirits of the present disclosure but provided to describe the present disclosure, and the scope of the technical spirits of the present disclosure is not limited by the implementations. Accordingly, the technical scope of the present disclosure should be construed by the attached claims, and all the technical spirits within the equivalent ranges fall within the scope of the present disclosure.

What is claimed is:
1. A moving body comprising:
a body;

8 a wheel coupled to the body and configured to rotate relative to the body;

an auxiliary wheel connected to the body and configured to move upwards and downwards relative to the body; and a connector that connects the body and the auxiliary wheel to each other, wherein at least a portion of the auxiliary wheel is configured to protrude downward relative to the wheel based on the auxiliary wheel moving to a lowermost side relative to the body, wherein the connector comprises:
a rotary shaft that extends in a left-right direction,
an auxiliary wheel motor configured to rotate the rotary shaft,
a first rotary member coupled to the rotary shaft and configured to rotate about the rotary shaft based on rotation of the rotary shaft, and
a connection member that extends in an up-down direction and is connected to the auxiliary wheel, the connection member being configured to move upwards and downwards relative to the body based on rotation of the first rotary member about the rotary shaft, wherein the rotary shaft faces the connection member in a forward direction or a rearward direction, wherein one of the forward direction or the rearward direction defines a reference direction, and wherein the body has a contact part configured to contact a side surface of the first rotary member in the reference direction to thereby limit rotation of the first rotary member in the reference direction based on the auxiliary wheel moving to the lowermost side.

2. The moving body of claim 1, wherein the rotary shaft and the connection member are spaced apart from each other in a forward-rearward direction.

3. The moving body of claim 1, wherein the first rotary member comprises a protrusion disposed at a lower end of the first rotary member, the protrusion being configured to protrude in the reference direction based on the auxiliary wheel moving to the lowermost side.

4. The moving body of claim 3, wherein the body further comprises:
a support area configured to contact and support an upper surface of the protrusion, the support area being configured to be disposed below the upper surface of the protrusion based on the auxiliary wheel moving to the lowermost side.

5. The moving body of claim 1, wherein the auxiliary wheel is configured to rotate about a first axis extending in the up-down direction and to rotate about a second axis extending in a direction orthogonal to the up-down direction.

6. The moving body of claim 1, further comprising a controller configured to control the auxiliary wheel motor.

7. The moving body of claim 1, wherein the wheel is one of a pair of wheels disposed at left and right sides of the body, respectively, and
wherein the auxiliary wheel is disposed in the body between the pair of wheels.

8. The moving body of claim 7, wherein the body extends in a front-rear direction, and
wherein the auxiliary wheel is disposed at a rear side of the body.

9. The moving body of claim 7, wherein a diameter of the auxiliary wheel is less than a diameter of the pair of wheels.

10. The moving body of claim 1, wherein the contact part of the body is configured to, based on contacting the side surface of the first rotary member in the reference direction, restrict the auxiliary wheel from moving upward from the lowermost side.

11. The moving body of claim 1, wherein the connector further comprises:

a second rotary member having (i) an upper side connected to the first rotary member and configured to rotate relative to the first rotary member and (ii) a lower side connected to the connection member and configured to rotate relative to the connection member.

12. The moving body of claim 11, wherein the second rotary member is configured to be disposed in upward and downward directions based on the auxiliary wheel moving to the lowermost side.

13. The moving body of claim 12, wherein the rotary shaft faces the connection member in the forward direction or the rearward direction, and wherein an upper end of the second rotary member is offset from a lower end of the second rotary member in the reference direction.

14. The moving body of claim 11, wherein the body further comprises:

a linear guide member disposed at front and rear sides of the connection member and configured to restrict the connection member from moving in the forward and rearward directions.

15. The moving body of claim 14, wherein the connection member defines grooves at front and rear surfaces of the connection member, the grooves extending in the up-down direction, and wherein the linear guide member comprises an insertion portion configured to be inserted into the grooves.

16. The moving body of claim 11, wherein a length of the first rotary member is less than a length of the second rotary member.

17. The moving body of claim 11, wherein the first rotary member and the second rotary member are configured to rotate about a first rotation axis parallel to the rotary shaft, and wherein the second rotary member and the connection member are rotate about a second rotation axis parallel to the rotary shaft.

* * * * *